United States Patent [19]

Oldweiler et al.

[11] Patent Number: 5,078,490
[45] Date of Patent: Jan. 7, 1992

[54] SYSTEM AND METHOD FOR CHECKING THE AIM OF A VEHICLE HEADLAMP

[75] Inventors: William E. Oldweiler, Reading; Wesley E. Bowden; Gregory A. Yotz, both of Emporia, all of Kans.

[73] Assignee: Hopkins Manufacturing Corporation, Emporia, Kans.

[21] Appl. No.: 661,474

[22] Filed: Feb. 26, 1991

[51] Int. Cl.$^5$ .................. G01J 1/00; G01B 11/27
[52] U.S. Cl. .................................. 356/121; 33/288
[58] Field of Search ............... 356/121; 33/288, 335

[56] References Cited

U.S. PATENT DOCUMENTS

| | | | |
|---|---|---|---|
| 3,077,139 | 2/1963 | Todd et al. | |
| 3,386,333 | 6/1968 | Preston | |
| 3,467,473 | 9/1969 | Preston | 356/121 |
| 3,515,483 | 6/1970 | Irwin | 356/121 |
| 3,532,432 | 10/1970 | Mansour | 356/121 |
| 3,709,609 | 1/1973 | Spengler et al. | 356/152 |
| 4,609,939 | 9/1986 | Kozawa et al. | 358/101 |
| 4,647,195 | 3/1987 | Ishikawa et al. | 356/121 |
| 4,730,923 | 3/1988 | Kosugi et al. | 356/121 |
| 4,744,655 | 5/1988 | Sdika | 356/121 |
| 4,948,249 | 8/1990 | Hopkins et al. | 356/121 |

*Primary Examiner*—F. L. Evans
*Attorney, Agent, or Firm*—Calfee, Halter & Griswold

[57] ABSTRACT

A system and method for checking the aim of the high and low beams of a vehicle headlamp are provided. The system comprises a vehicle position locator adapted to be centered under the vehicle, and a target screen located at a predetermined distance from the headlamp of a vehicle centered on the locator. A laser/prism subassembly is mounted to the locator for lateral and vertical movement relative to the vehicle. The prism directs the laser beam toward the headlamp when it is positioned in front of the laser. A plurality of photosensors on the target screen sense the intensity of a light beam from the headlamp, and meters on the target screen indicate comparisons of the levels of intensity of portions of the beam sensed by the individual photosensors. The method comprises the steps of directing the laser beam at the center of the headlamp lens with the prism, fixing the position of the laser with respect to the headlamp lens, and moving the prism to redirect the laser beam at the target screen to establish an origin point for a properly aimed headlamp. The vehicle headlamp is then shined upon the photosensors. If the headlamp beam intensities sensed by the photosensors have the proper comparative distribution, the meters will verify the proper aim of the headlamp. If not, the target screen is moved until the meters show an acceptable aim indication. The steps of directing the laser light beam at the center of the headlamp lens, fixing the laser position, and redirecting the laser light beam at the target screen are then repeated. The distance on the screen between the origin point and the location of the laser beam after moving the screen indicates the amount of headlamp misalignment. The headlamp is accepted only if this distance is within prescribed limits.

25 Claims, 11 Drawing Sheets

SYSTEM AND METHOD FOR CHECKING THE AIM OF A VEHICLE HEADLAMP

Technical Field

The present invention relates to a system and method for checking the aim of vehicle high beam and low beam headlamp illumination patterns, either during vehicle manufacture or after the vehicle has been in use.

BACKGROUND

Vehicle headlamps are designed to illuminate an area in front of the vehicle by projecting high intensity beams of light in prescribed patterns over selected portions of a roadway. Vehicles are generally equipped with a first pair of high beam headlamps and a second pair of low beam headlamps. The high beam headlamps are designed to illuminate the entire width of the roadway in front of the vehicle and a greater length of roadway than that illuminated by the low beam headlamps. The low beam headlamps project a pattern of light downward and to the right of the high beam illumination pattern so as not to temporarily blind an oncoming motorist. In some vehicles, high and low beam illumination patterns are projected from the same headlamp using different filaments.

In order to produce the desired illumination pattern for both the high and low beams, the headlamps must be properly aimed. Standards for headlight aiming and illumination patterns are prescribed by industrial groups, such as the Society for Automotive Engineers (SAE), and by governmental agencies. Generally, different aiming and illumination pattern standards have been prescribed for different geographical areas, such as North America and Europe, making it difficult to produce universally applicable device for checking the aim of vehicle headlamps.

Methods and devices for aiming and determining misalignment of vehicle headlamps are known. Examples of these known methods and devices are shown in Preston U.S. Pat. No(s). 3,386,333 and 3,467,473; Ishakawa et al. U.S. Pat. No. 4,647,195; and Hopkins et al. U.S. Pat. No. 4,948,249. Each of these references discloses both a method and a device for testing the aim of an automotive headlamp.

Preston U.S. Pat. No. 3,386,333 describes means for properly aiming the illumination pattern of a low beam headlamp by properly determining and locating the edge of a high intensity zone of the low beam illumination pattern on a headlamp target board. Light sensitive devices or photoreceptors are positioned on the target board. As an operator adjusts the headlamps to scan the light sensitive devices or photoreceptors, the proper aiming of the headlamps will be achieved when meters indicate a minimum value.

Also to Preston U.S. Pat. No. 3,467,473, discloses a photoelectric headlamp aiming apparatus and method in which a high intensity zone of the low beam headlamps of a vehicle may be properly positioned by scanning the high intensity zone over an aiming board. The aiming board includes photoreceptors positioned relative to a properly positioned edge of the high intensity zone, and computing means for determining the rate of change of the intensity curve as the edge of the high intensity zone is scanned over the photoreceptors. When this rate of change is maximized, the high intensity zone of the low beam headlamps is properly positioned and aimed.

Ishikawa's headlamp testing device and method, as shown in U.S. Pat. No. 4,647,195, involves the steps of shining the low beam of the vehicle headlamp onto a screen and determining the position of the geometrical center of a closed area of illuminance. A cut off line cross point is determined from the position of the geometrical center and a predetermined amount of offset, and a presumption line is determined from the cut off line cross point. The presumption line is displayed together with a mark which indicates an area within which the cross point should fall for a headlamp having a correctly aligned beam axis.

Hopkins U.S. Pat. No. 4,948,249 shows another method and apparatus for determining proper headlight aiming, in which SAE test conditions are simulated. The light beam of the headlamp is focused on a screen having a sensor for sensing the light intensity in each cell of a matrix of cells which overlies the focused light beam. The sensor produces an analog or digital electrical signal for each cell which indicates the cell location and the intensity of light within that cell. Analog signals are preferably digitized. The digital signals are then manipulated by computer to determine headlight aiming accuracy, to correct inaccurate aiming, and to describe the illumination pattern of the headlight.

While the described methods and devices for aiming and determining misalignment of vehicle headlamps are useful in checking and correcting the aim of the headlamps, each is limited in its application. The known methods and devices are either not readily adaptable to changing aiming standards because they sense light at a limited number of discrete locations in the headlamp beam, or they are incapable of checking headlamp aim under actual, and not merely simulated, SAE test conditions. None of the foregoing patents discloses a universally adaptable and fully portable device for checking the aim of a vehicle headlamp under actual SAE test conditions, and for graphically displaying the difference between the actual aim of a vehicle headlamp and the aim of a headlamp having true alignment.

It is therefore an object of the present invention to provide a system for checking the aim of a vehicle headlamp under actual SAE conditions which is adaptable for use with all sizes of vehicles.

It is another object of the invention to provide a portable system for determining if the aim of a vehicle headlamp is within prescribed standards, and for providing a visual indication of the difference between the aim of a properly aligned headlamp and the actual aim of the headlamp.

It is a further object of the invention to provide a method for checking the aim of a vehicle headlamp under actual SAE conditions using a portable system which is universally applicable for use with all sizes of vehicles.

SUMMARY OF THE INVENTION

The present invention provides a new and useful system and method for checking the alignment of both low and high beam headlamps of a vehicle, either during manufacture or after the vehicle has been in use. The system includes portable components and is universally adaptable for testing all sizes of vehicles. The method provides means for quickly and accurately determining if the headlamps are aligned within prescribed specifications.

The system comprises a vehicle position locator and a target screen assembly. The vehicle position locator has casters upon which it rolls, and is designed to be positioned and centered beneath the undercarriage of a vehicle. The vehicle position locator comprises a center beam having left and right side rails extendibly connected in parallel thereto, and a movable laser tower mounted on a lateral beam which is attached perpendicular to the center beam. The left side rail is attached to the center beam by two air-driven cylinders having extendible pistons. A rack and pinion arrangement interconnecting the left and right side rails with the center beam communicates the linear movement of the left side rail away from the center beam to the right side rail. In this manner, each of the side rails travels the same distance until it contacts the interior side walls of tires located on the left and right sides of the vehicle, thereby centering the vehicle position locator.

The movable laser tower is slidably mounted to the lateral beam, permitting horizontal lateral movement of the tower in front of and relative to the vehicle. A laser/prism subassembly is slidably mounted to the laser tower, permitting vertical movement of the subassembly relative to the tower. Thus, the laser/prism subassembly can be moved vertically and laterally to accommodate headlamp testing of all sizes of vehicles.

A laser is fixedly mounted to the laser/prism subassembly. A prism is rotatably mounted to the subassembly, so that the prism can be positioned in or out of the path of the laser beam. With the prism positioned in the path of the laser beam, the beam is reflected in a direction toward the headlamp being tested. With the prism positioned out of the way of the laser beam, the beam is permitted to travel unobstructed in a direction toward the target screen assembly.

The target screen assembly also has casters upon which it rolls, and includes an aim screen having photosensors which sense the intensity of the headlamp low and high beams, electronic circuitry for comparing the levels of intensity at various photosensor locations, and meters for displaying the results of these comparisons. An overlay covering the electronic circuitry indicates an origin point representing the location of the center of a properly aimed headlamp beam. Gradations on the overlay are used to measure the extent of misalignment of the headlamp beam.

In operation, the vehicle position locator is positioned and centered beneath the vehicle. The parallel positioning of the laser beam with the longitudinal axis of the vehicle position locator may be verified using a target selectively mounted on the vehicle position locator in spaced relationship from the laser. The aim screen is positioned at a prescribed distance in front of the vehicle. Per SAE specifications, the prescribed distance is 25 feet.

The laser beam is reflected by the prism generally toward the headlamp lens being checked. The laser is adjusted laterally and vertically until the beam intersects the center of the headlamp lens, and the laser is locked into this position. The prism is then rotated out of the path of the laser beam, permitting the laser beam to travel unobstructed toward the target screen assembly. The target screen assembly is moved lateral, and the aim screen is moved vertically until the laser beam falls upon the origin point on the aim screen overlay. The laser tower is then moved away from the center of the headlamp and the headlamp is turned on. The illumination pattern emitted by the headlamp falls upon the photosensors. The electronic circuitry compares the intensity levels of the headlamp beam at various photosensor locations, and meters display readings corresponding to these comparisons. If the readings are within prescribed specifications, the headlamp is accepted as being correctly aimed.

If the meters should not display readings within the prescribed range, the target screen assembly and the aim screen are moved horizontally and vertically, respectively, until acceptable readings are obtained. At this point the operator repeats the steps of adjusting the laser until its reflected light beam intersects the center of the headlamp, locking the laser in this position, and redirecting the laser light beam onto the aim screen. The location on the screen at which the laser light beam is directed is compared to the established origin point. The distance between these two points indicates the extent of misalignment of the headlamp, and the headlamp is accepted or rejected based on this distance.

DETAILED DESCRIPTION OF THE PREFERRED EMBODIMENT

Figure 1:
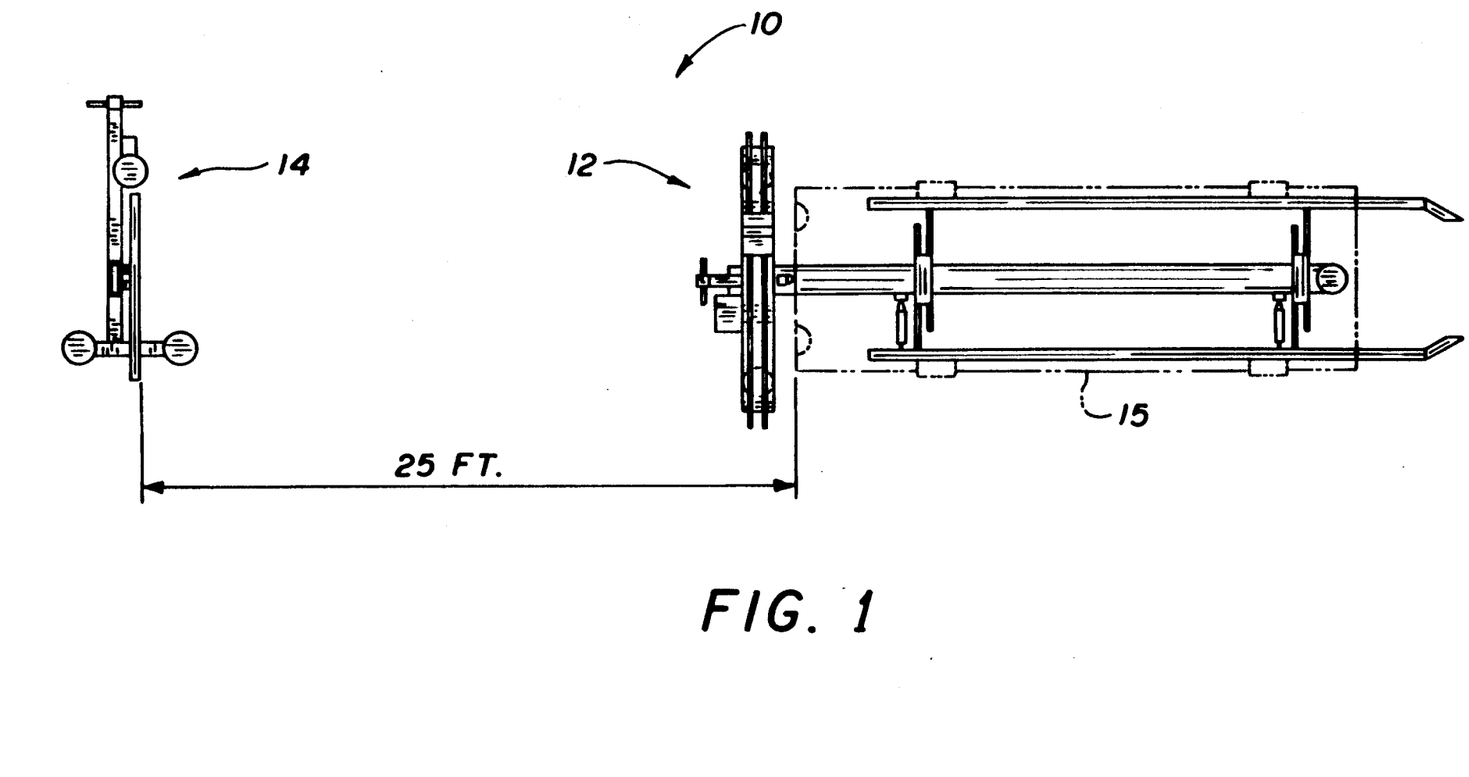
FIG. 1 is a plan view of the system including a vehicle position locator centered under a vehicle and a target screen assembly for checking for proper aim of a vehicle headlamp according to the present invention.

Referring now to the drawings, FIG. 1 shows a plan view of a system 10 constructed according to the principles of the present invention. The system 10 comprises a vehicle position locator, indicated generally at 12, and a target screen assembly, indicated generally at 14. As shown in FIG. 1, the vehicle position locator 12 is positioned and centered under a vehicle 15 so that the headlamps of the vehicle shall be twenty-five feet away from the target screen assembly 14, a distance which corresponds to that required by SAE headlamp testing specifications.

Figures 2, 5:
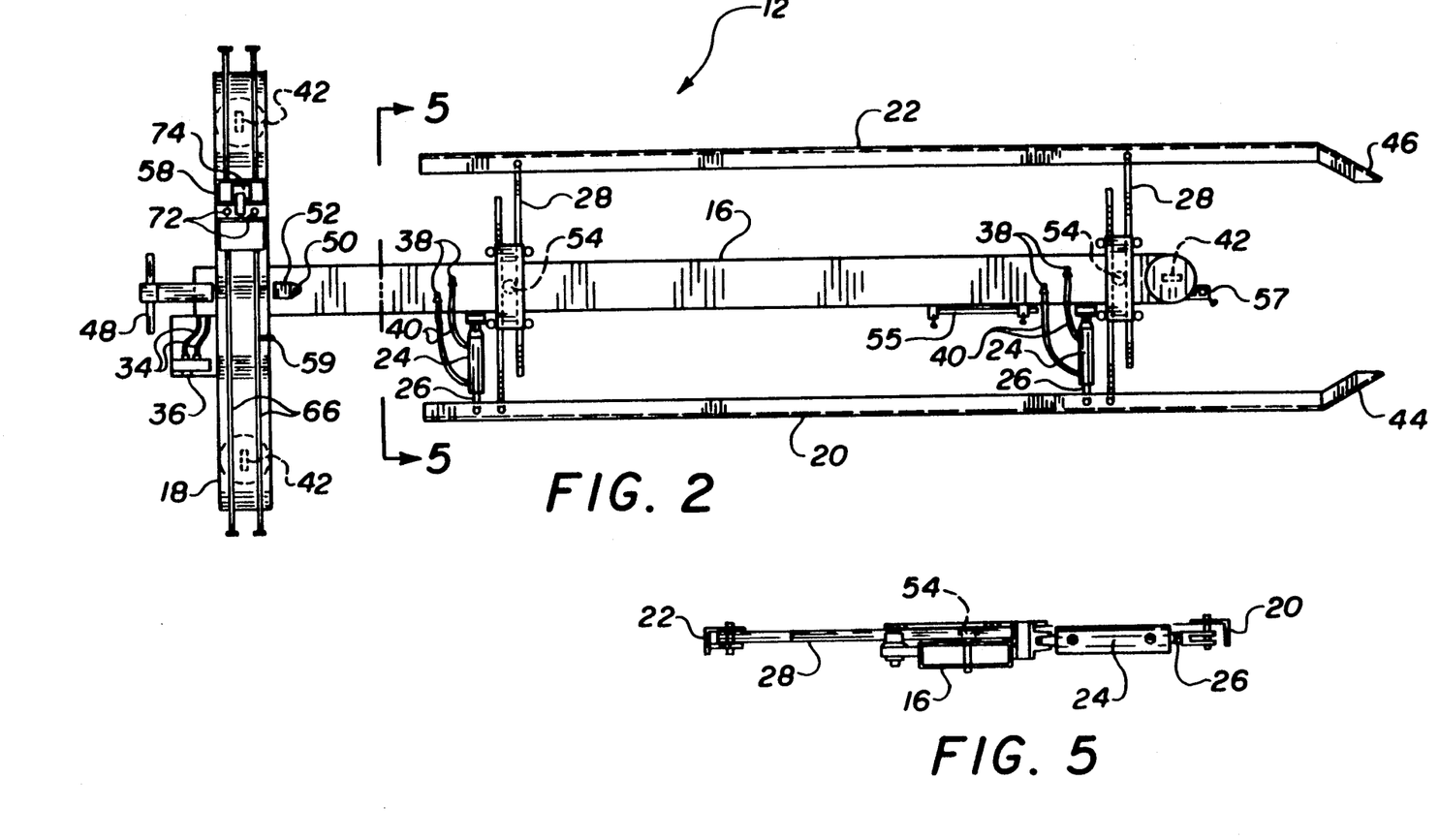
FIG. 2 is a plan view of the vehicle position locator of the present invention.
FIG. 5 is a sectional view of the vehicle position locator taken along the plane 5—5 of FIG. 2.

The vehicle position locator 12 is shown in more detail in FIGS. 2-5. Viewed from above, as shown in FIG. 2, the vehicle position locator 12 is built around a center beam 16, which lies directly beneath the longitudinal axis of the vehicle when in use, and a lateral beam 18, which is connected perpendicular to center beam 16 and lies in front of the vehicle. The term "lateral" as used herein means a direction parallel to the front of a vehicle centered on the vehicle position locator. The term "longitudinal" as used herein means a direction parallel to the longitudinal axis of the centered vehicle and perpendicular to the lateral direction. A left side rail 20 and a right side rail 22 are parallel to one another and are movably attached to center beam 16 by means of a pneumatic system. This system includes a pair of air cylinders 24 each having extendible pistons 26, and a pair of rack and pinion arrangements 28 (also see FIG. 5).

Figures 3, 4:
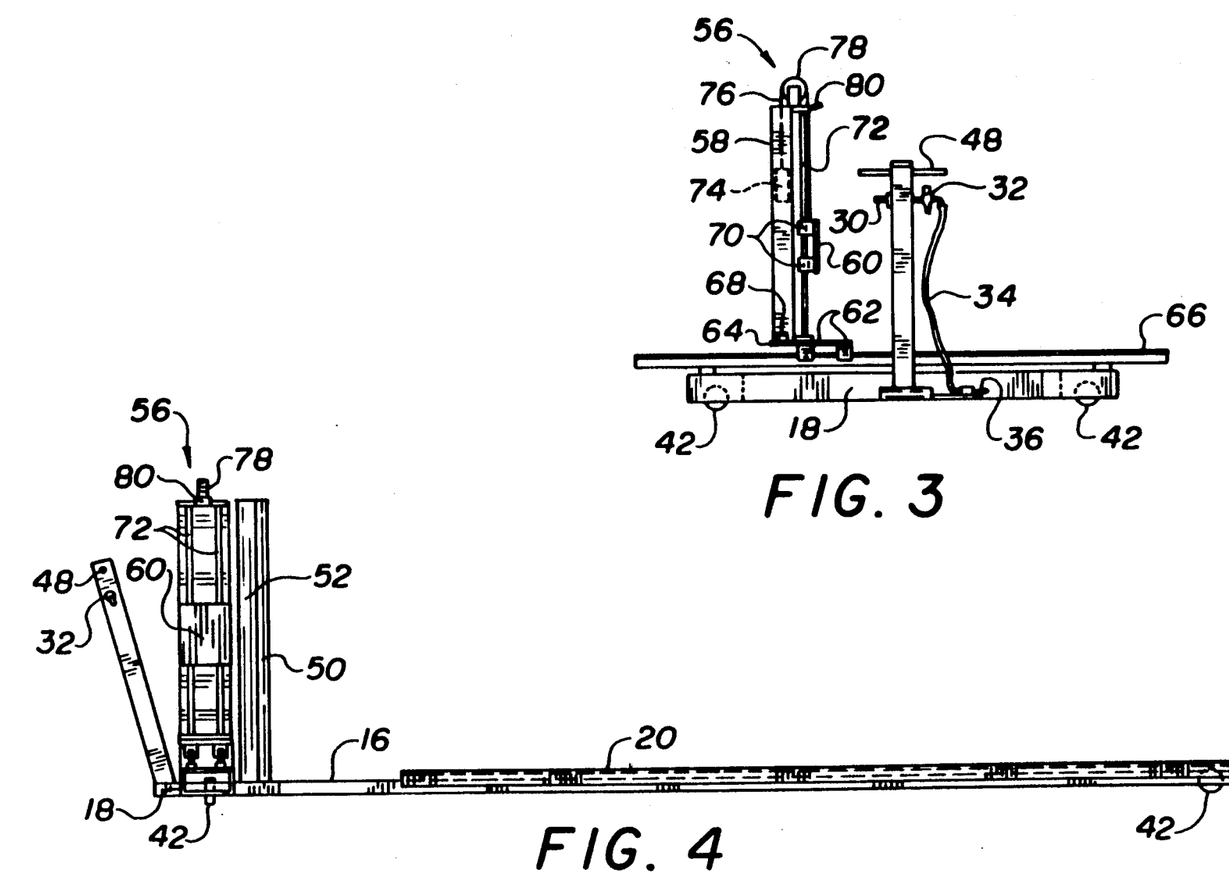
FIG. 3 is a front view of the vehicle position locator.
FIG. 4 is a side view of the vehicle position locator.

Compressed air can be supplied to the pneumatic system through an air fitting 30 connected to a regulator 32 (see FIG. 3). The compressed air is communicated through a flexible hose 34 to a foot valve 36, through the center beam 16 to air fittings 38, and finally through flexible hoses 40 to each of the air cylinders 24. The regulator 32 is adapted to regulate standard shop pressure of 120 psi down to around 40 psi. The foot valve 36 is designed to both apply and release the reduced air pressure to the air cylinders 24.

Caster wheels 42 located at the rear end of center beam 16 and at both ends of lateral beam 18 allow the vehicle position locator 12 to be easily maneuvered under a vehicle undergoing the headlamp aiming check. The rear ends of both the left side rail 20 and the right side rail 22 have bent extensions 44 and 46, respectively, integral therewith and extending toward center beam 16. The bent extensions 44 and 46 facilitate positioning of the vehicle position locator under the vehicle and minimize the risk of gouging the vehicle tires.

The vehicle position locator 12 is adapted to be pushed under the front of the vehicle by means of handle 48 until the front of the vehicle contacts bumper 50, which is mounted on bumper stalk 52 and is preferably constructed of molded or extruded rubber. By activating foot valve 36, the pistons 26 in each of cylinders 24 are forced out of the cylinders and away from center beam 16. The portions of the rack and pinion arrangements located intermediate center beam 16 and left side rail 20 extend in the same direction as do the pistons 26. This lateral movement is communicated to pinion gears 54 which in turn communicate equivalent lateral movement to the portion of the rack and pinion arrangements located intermediate center beam 16 and right side rail 22. In this manner, left side rail 20 and right side rail 22 move equal distances outwardly from center beam 16 until each rail contacts respective inside sidewalls of the vehicle tires, thereby aligning the center beam 16 with the longitudinal axis of the vehicle.

A target 55 located on the center beam 16 may be used to verify the parallel alignment of the center beam with the output of a laser used with the device, before the vehicle position locator is centered under the vehicle. Because the center beam is adapted to be aligned with the longitudinal axis of the vehicle, the laser output, when properly aligned, will also be parallel to the longitudinal axis of the vehicle when the vehicle position locator is centered under the vehicle. The target 55 is positioned vertically in holder 57 when used, and stored horizontally on the side of center beam 16 when not in use. A stop 59 positions the laser with respect to the target 55 in holder 57 so that the parallel alignment of the center beam 16 and the laser can be verified. If the laser beam contacts the alignment target when the laser has been laterally positioned at stop 59, the laser is properly longitudinally aligned relative to the vehicle position locator.

With continued reference to FIGS. 2-5, and FIG. 3 in particular, a laser tower assembly 56 comprising a hollow housing 58 and a laser/prism mounting plate 60 is slidably mounted to lateral beam 18 for lateral, horizontally oriented movement relative to the vehicle centered upon the vehicle position locator. Bearing collars 62 mounted to a housing base plate 64 slidably engage a pair of rails 66 which are fixedly attached to lateral beam 18. In the preferred embodiment, rails 66 are precision rails manufactured by Thompson Mfg. A brake 68 permits the laser tower assembly 56 to be fixed in a particular lateral position along rails 66.

The laser/prism subassembly mounting plate 60 is adapted to receive a laser and a prism, and is slidably mounted to hollow housing 58. Bearing collars 70 bolted to plate 60 slidably engage a pair of vertically oriented rails 72 which are fixedly attached to hollow housing 58. Again, Thompson precision rails are preferred. Vertical movement of the plate 60 along the rails 72 is facilitated by a counterweight 74. Counterweight 74 is attached to plate 60 by means of a cable 76 which passes over a pulley 78. A hand operated pulley brake 80 permits the mounting plate 60, and hence a laser mounted to the plate, to be locked into a particular vertical position along rails 72. Thus, lateral positioning of the laser tower assembly 56 along rails 66, coupled with vertical positioning of the mounting plate 60 along rails 72, permits a laser attached to plate 60 to be properly positioned in front of any number of vehicle headlamp configurations.

Figure 6:
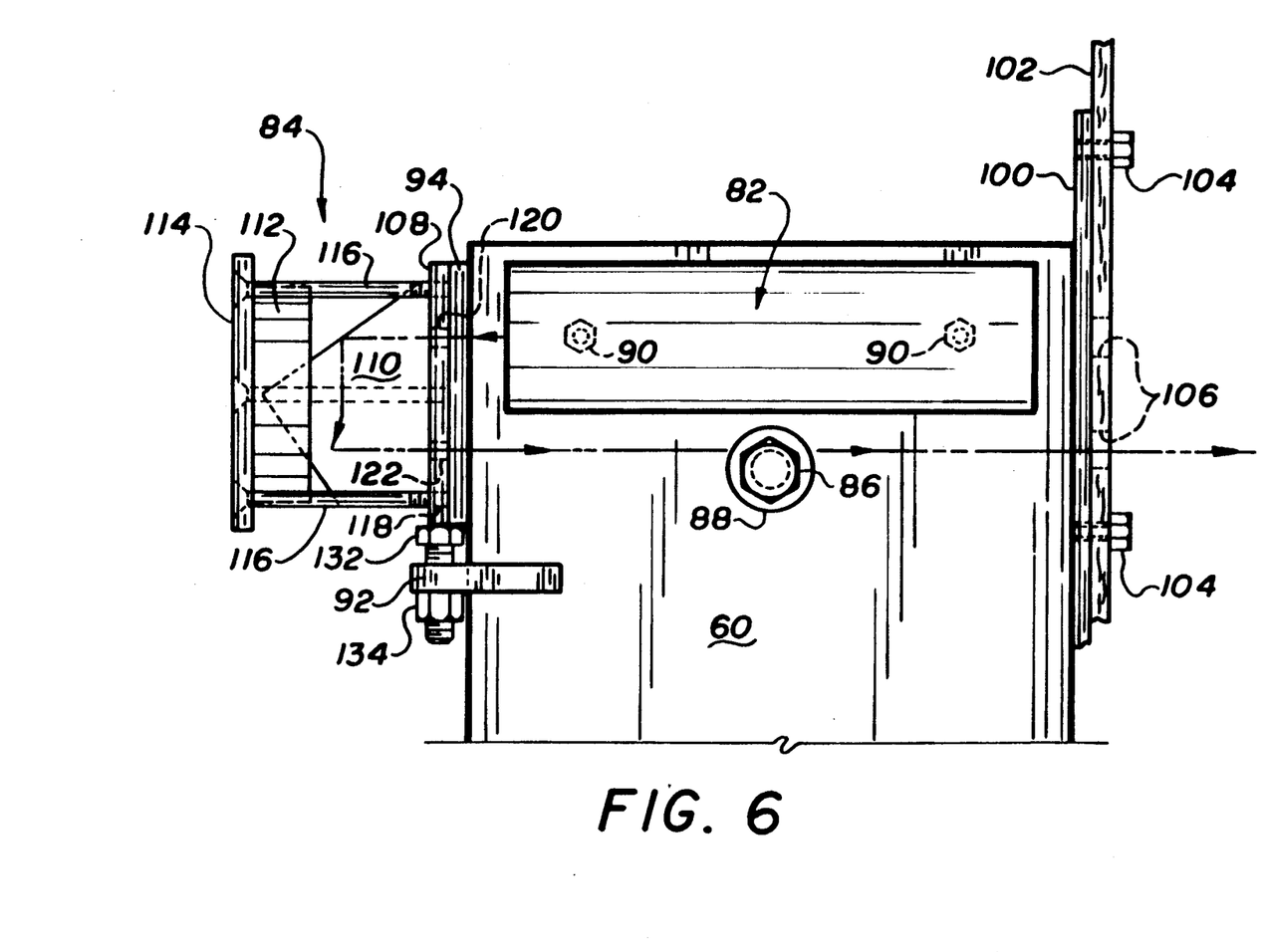
FIG. 6 is a side view of the laser/prism subassembly of the vehicle position locator.
Figure 7:
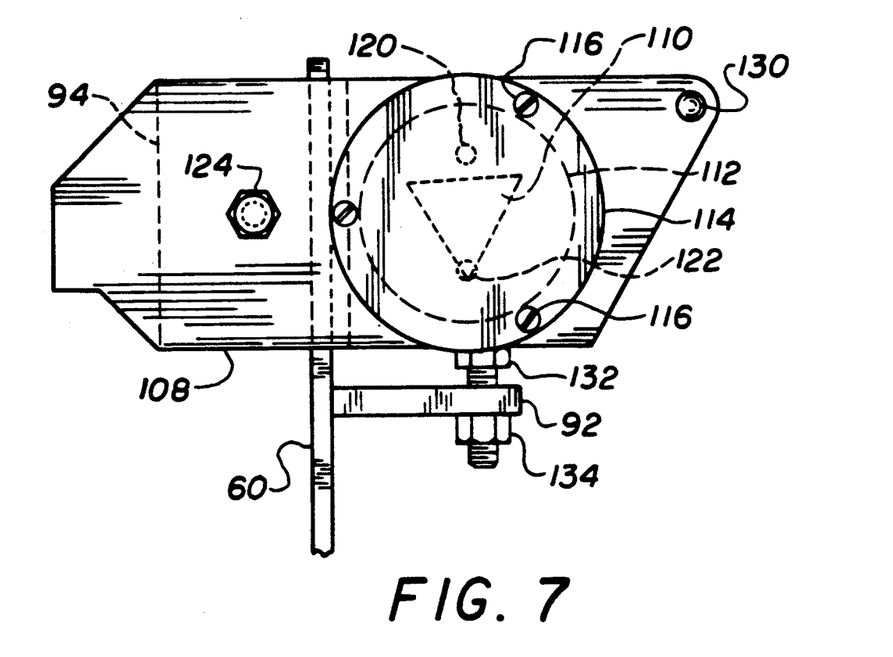
FIG. 7 is a front view of the laser/prism subassembly.
Figure 8:
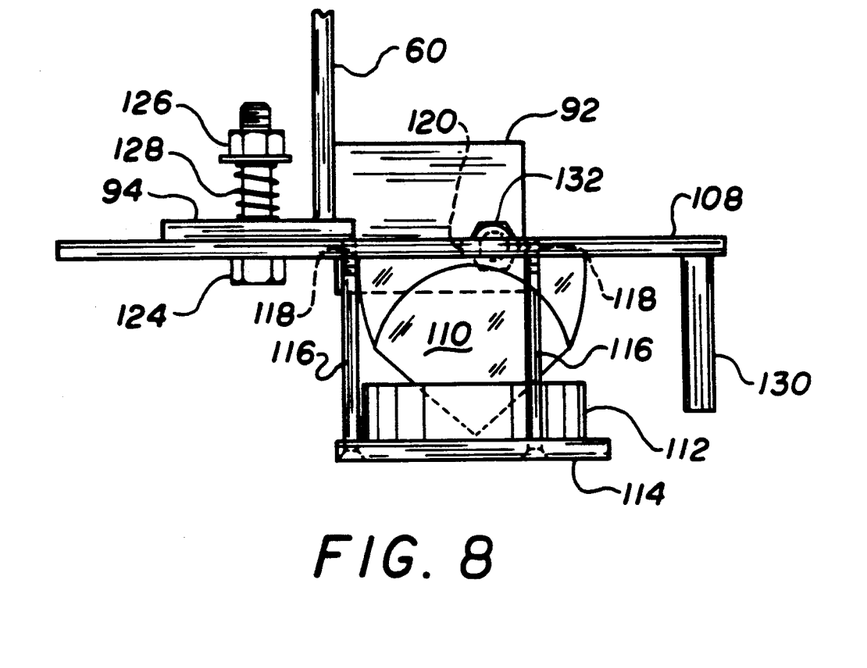
FIG. 8 is a plan view of the laser/prism subassembly.

As shown in FIGS. 6-8, and with particular reference to FIG. 6, both a laser 82 and a prism subassembly, indicated generally at 84, are mounted to laser/prism subassembly mounting plate 60. The plate 60 is in turn bolted to the bearing collars 70 using bolts 86 and washers 88. The laser used in the preferred embodiment is commercially available, for example model No. 1508-1 manufactured by Uniphase, Inc. The laser 82 is bolted to plate 60 with bolts 90 so that the laser beam emitted by the laser is initially directed 180° opposite a headlamp of a vehicle undergoing the headlight aiming test.

The prism subassembly 84 is used to selectively reflect the laser beam 180° back toward the headlamp. The preferred prism is a multiple internal reflection crystal shaped like a pyramid and constructed of optical grade glass. The reflected laser beam lies parallel to the incident laser beam entering the prism, but is vertically offset from the incident beam by 1½.

Although the preferred means of reflecting the laser beam back to the headlamp is a prism, alternative means are contemplated. For example, laser 82 can be pivotally mounted to plate 60, so that by pivoting the laser, the laser beam can be directed toward the vehicle headlamp or toward the aim screen. Another embodiment would substitute a reflecting mirror or series of mirrors in place of prism 110. In either of these embodiments, it is possible to establish a colinear relationship between the laser beam when directed toward the headlamp and the laser beam directed toward the aim screen. Such an embodiment would eliminate the 1½" vertical offset between the incident and reflected laser beam in the preferred embodiment.

A threaded extension 92 welded to plate 60 is used to limit the rotational movement of the prism subassembly 84 with respect to the laser 82. Welded to plate 60, perpendicularly, is a spacer plate 94 upon which the prism subassembly is rotatably mounted. Also welded perpendicularly to plate 60 is a mounting plate 100 onto which a plywood board 102 is attached using bolts 104. A hole 106 in board 102 permits the laser beam reflected by the prism subassembly 84 to pass through the board in a direction generally toward a vehicle headlamp lens. The board 102 is subsequently used to block out the light emitted by the vehicle headlamp which is not undergoing the aim test.

The prism subassembly 84 comprises a prism base plate 108, a prism 110, a prism retainer 112, and a prism cover 114. Threaded bolts 116 are received by threaded holes 118 in the base plate 108 to secure the prism 110 and the retainer 112 intermediate the cover 114 and the base plate 108. The base plate has holes 120 and 122 therein permitting the incident and reflected laser beam, respectively, to pass therethrough.

The manner in which the prism subassembly 84 is attached to spacer plate 94 is shown in FIGS. 7 and 8. The prism subassembly 84 is rotatably mounted to spacer plate 94 by means of a bolt 124, a nut 126 and a compressible spring 128 disposed intermediate spacer plate 94 and nut 126. The spring 128 permits pivotal contact between spacer plate 94 and base plate 108. A handle 130 is used to rotate the prism subassembly in and out of the path of the beam emitted by laser 82. The extent of rotation of the prism subassembly 84 is limited by adjusting the position of a threaded bolt 132 with respect to threaded extension 92, and locking the bolt 132 in place with nut 134.

Figure 9:
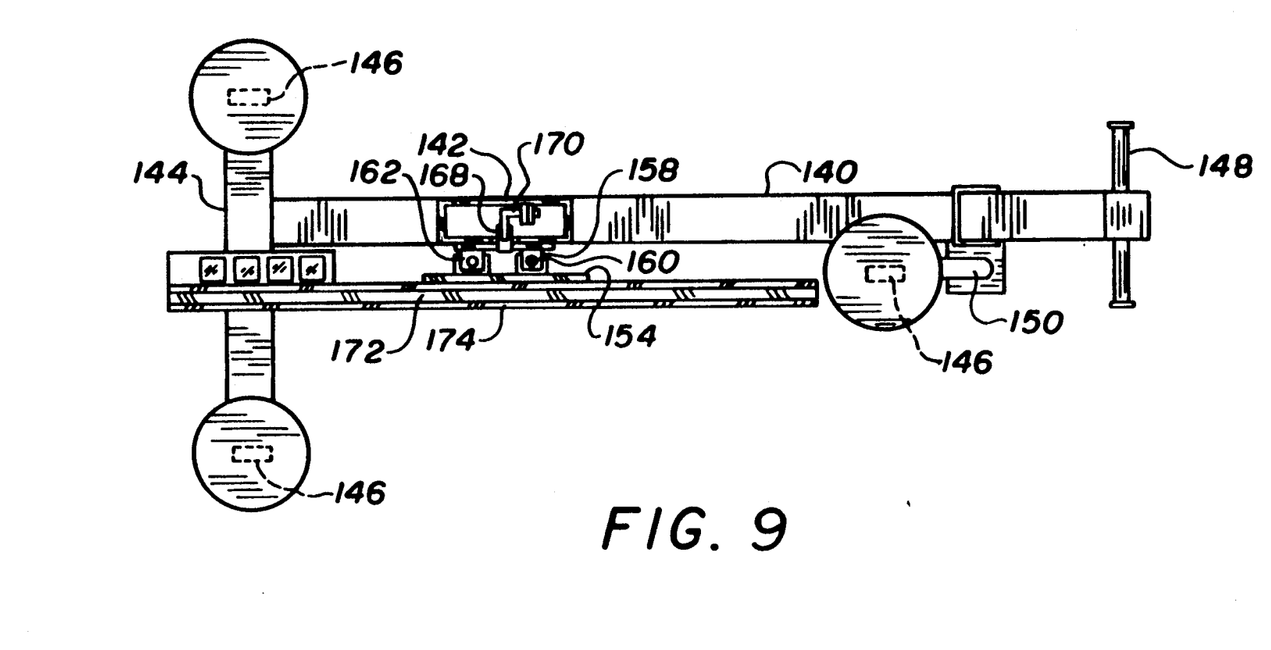
FIG. 9 is a plan view of the target screen assembly of the present invention.
Figure 10:
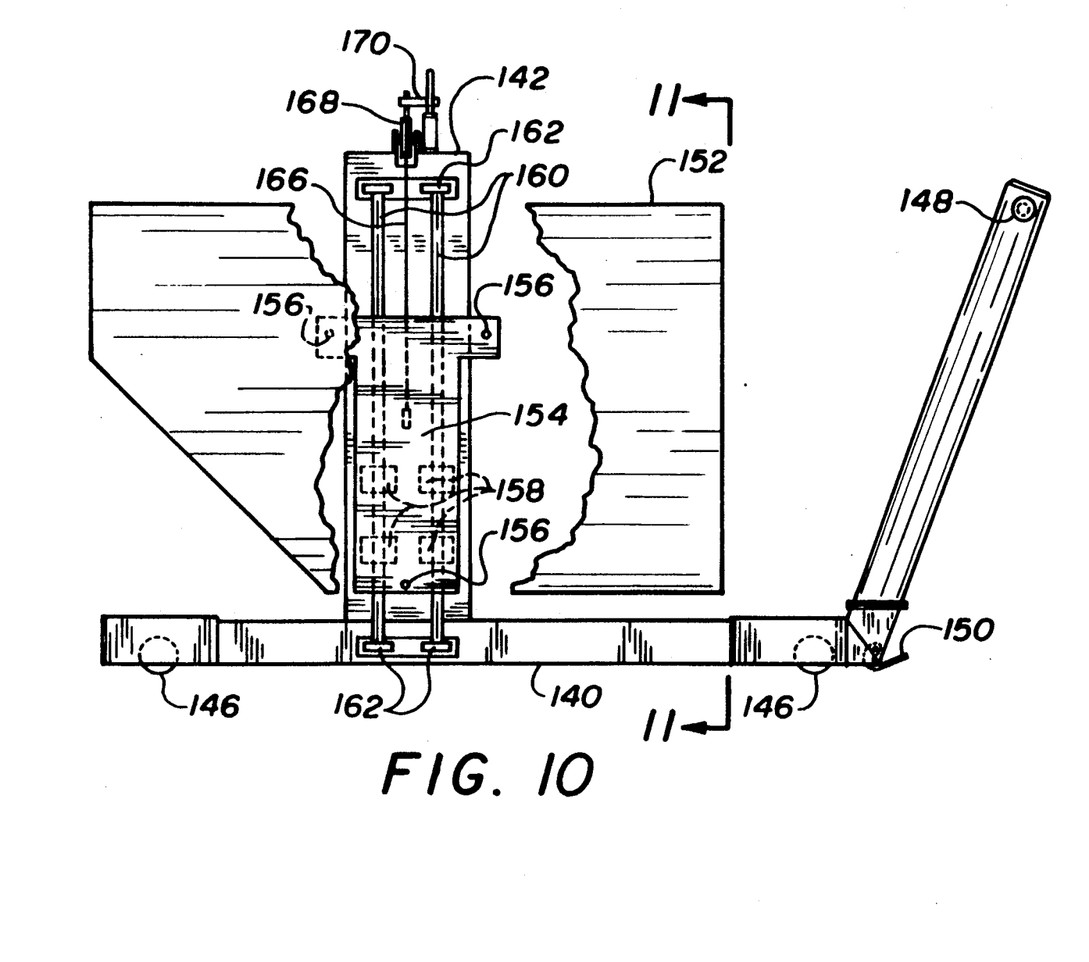
FIG. 10 is a partially broken away, front view of the target screen assembly.
Figure 11:
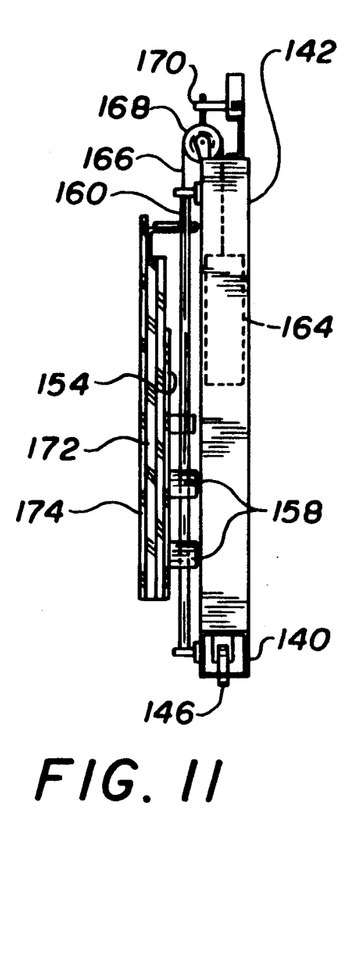
FIG. 11 is a sectional view of the target screen assembly taken along the plane 11—11 of FIG. 10.

The target screen assembly 14 is shown in more detail in FIGS. 9-11. As shown in FIG. 9, the target screen assembly 14 includes a frame comprising a laterally extending main beam 140, a vertically extending hollow aim screen tower 142 fixedly mounted on and extending upwardly from main beam 140, and a horizontally extending support beam 144 attached perpendicular to main beam 140. Casters 146 mounted on both ends of support beam 144 and on the end of main beam 140 opposite support beam 144 facilitate movement of the target screen assembly. The assembly is easily maneuvered using handle 148, and the position of the assembly can be fixed by means of a floor brake 150 (also see FIG. 10).

As shown in FIG. 10, vertically extending aim screen 152 is located parallel to main beam 140 of the target screen assembly 14. The aim screen 152 is fixedly attached to a mounting plate 154 which is slidably attached to the hollow aim screen tower 142 by means of bearing collars 158. The screen 152 is attached to the front of plate 154 at locations 156, and bearing collars 158 are mounted to the back of plate 154. The bearing collars 158 are adapted to slidably engage vertical rails 160 which are attached at both ends of tower 142 by rail mounts 162.

Horizontal movement of the target screen assembly 14 in a lateral direction relative to a vehicle being tested is accomplished by manually rolling the assembly on casters 146, and a particular horizontal position may be fixed using floor brake 150. Vertical movement of the aim screen 152 with respect to the tower 142 is accomplished by sliding the screen along the rails 160. Vertical movement is facilitated by means of a counterweight 164 (see FIG. 11) which is attached to the back of plate 154 by a cable 166 which passes over a pulley 168. A hand operated pulley brake 170 permits the vertical position of screen 152 to be fixed with respect to tower 142.

Figure 12:
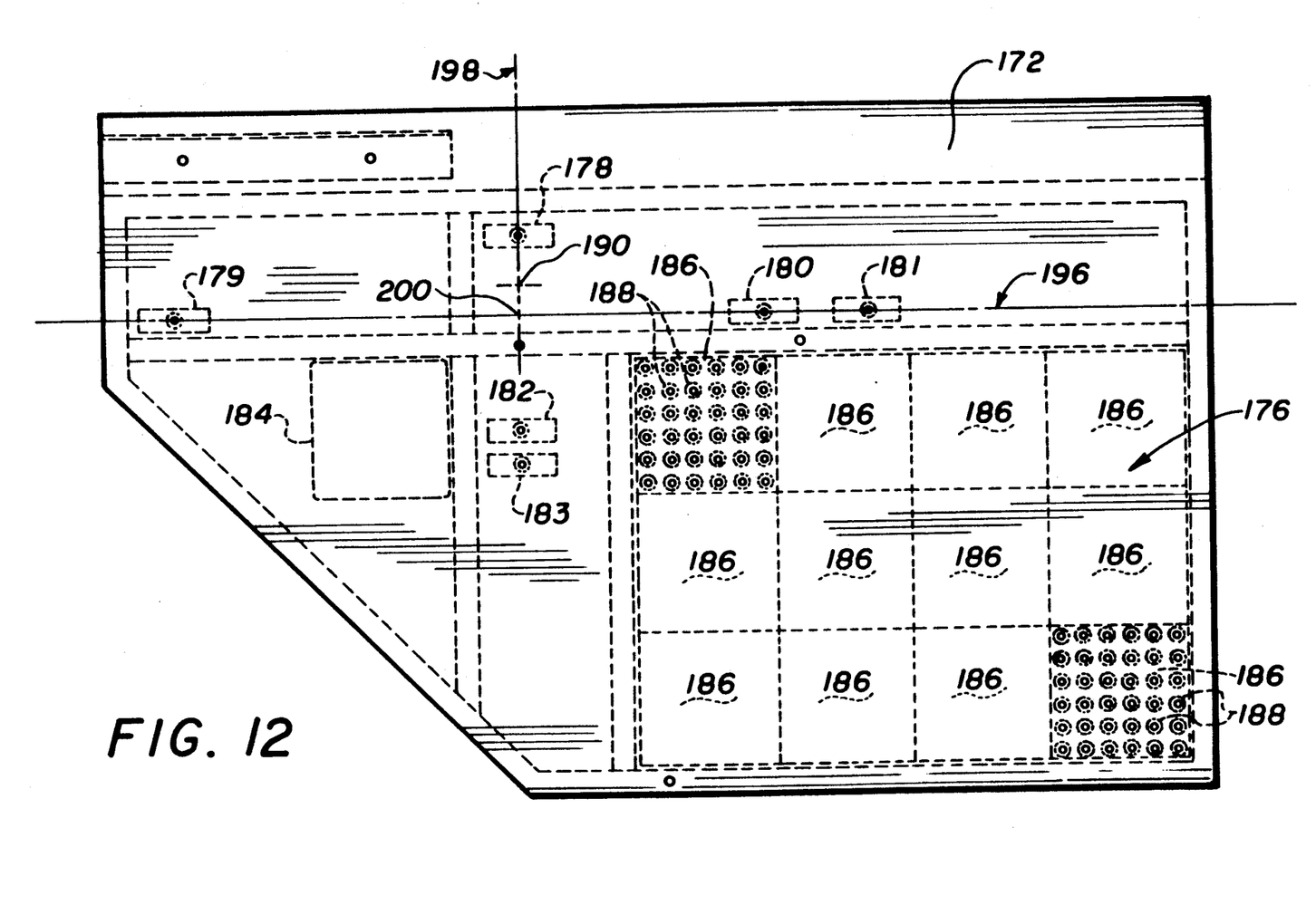
FIG. 12 is a front elevation of the electronic circuit board of the target screen assembly.
Figure 15:
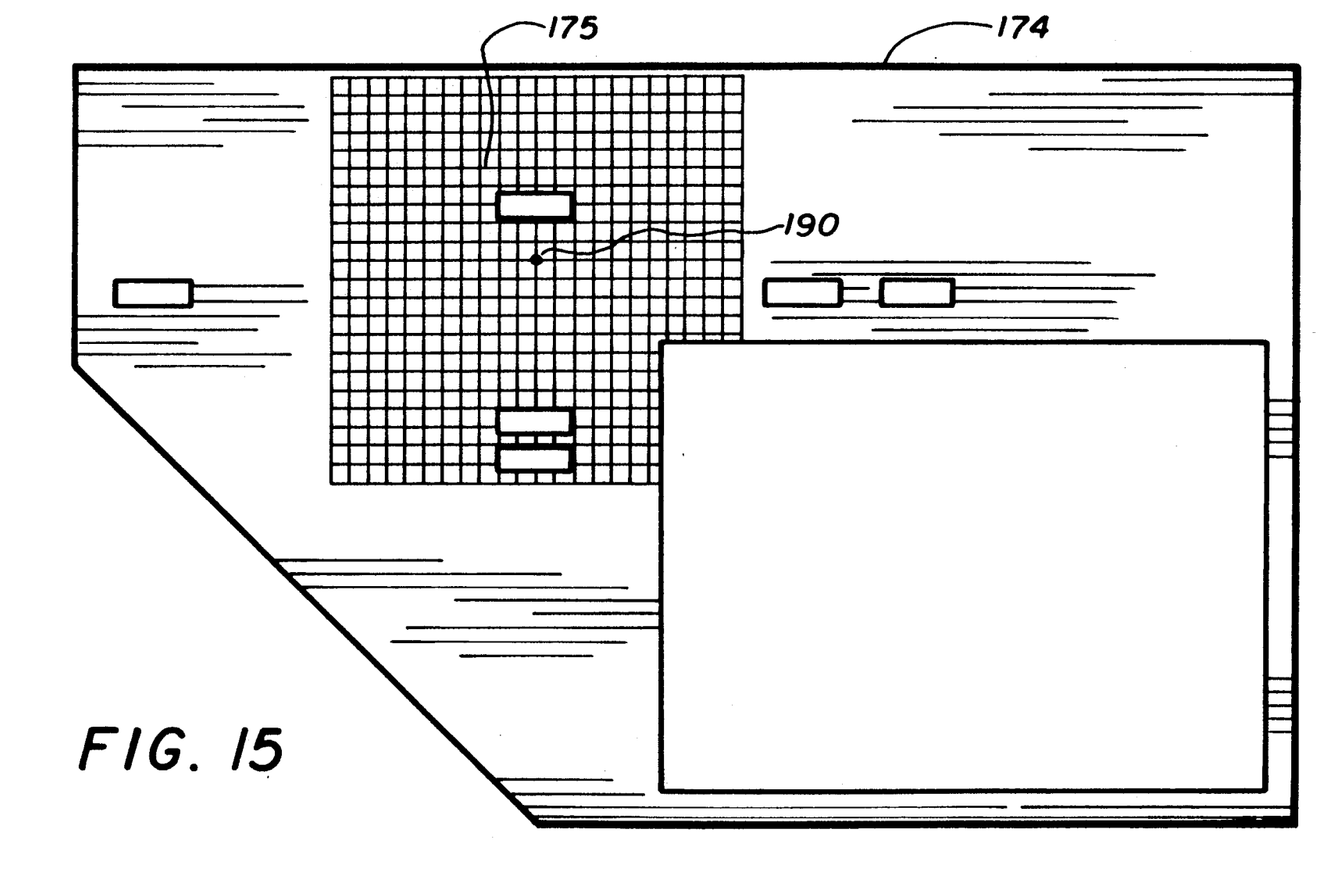
FIG. 15 is a front elevation view of the electronic circuit board overlay of the target screen assembly.

FIG. 11 shows a sectional view of the target screen assembly 14. The screen 152 comprises an electronic circuit board 172 and a circuit board overlay 174, planar views of which are shown in FIGS. 12 and 15, respectively. As shown in FIG. 12, the electronic circuit board 172 comprises a photosensor array 176, six individual aim photosensors 178-183, and a logic board 184. The photosensor array 176 and the aim photosensors 178-183 detect the intensity of the portions of a headlamp beam shining on their respective surfaces, and output electrical signals corresponding to the levels of intensity sensed. In testing for proper low beam aim, the logic board 184 determines the location of highest intensity in the array, and compares the value of highest intensity with the intensity detected by each of the aim photosensors 180 and 182. To test for proper high beam aim, the logic board 184 balances the intensity levels sensed at photosensors 178 and 179 with the intensity sensed at photosensors 183 and 181, respectively.

The photosensor array 176 is constructed by electrically interconnecting in parallel a plurality of photosensor cards 186, each having a 6×6 matrix of individual photosensors 188 which are connected electrically in parallel to each other. Preferably, photosensors such as model No. BS-100C, manufactured by Sharp, Inc., are used in constructing array 176. As shown in FIG. 12, twelve such cards are used in constructing the array. Each of the individual photosensors 188 detects the portion of a low beam illumination pattern shining upon its surface and outputs a voltage signal corresponding to the level of illumination. Because all photosensors 188 are connected electrically in parallel, the voltage output of array 176 equals the highest voltage outputted by any of the photosensors in the array.

The photosensor array 176 and the aim photosensors 178-183 are disposed at particular locations on the circuit board 172 corresponding to SAE standards. SAE standard J-579, effective Dec. of 1984, is incorporated by reference herein. The SAE low beam aiming standard specifies that two points having a fixed geometrical relationship to each other must also have a particular intensity relationship. One of the points must lie on a horizontal axis 196 2° to the right of an axis drawn perpendicular from the center of the headlamp lens, and have an intensity equal to 20 percent of the maximum low beam intensity measured by photosensor array 176. In FIG. 12, this point is represented by low beam aim photosensor 180. The other point must lie on a vertical axis 198, 1° below the axis drawn perpendicular from the center of the headlamp lens, and have an intensity of 30 percent of the maximum low beam intensity measured by photosensor array 176. On circuit board 172, this point is represented by low beam aim photosensor 182.

The intersection 200 of horizontal axis 196 and vertical axis 198 represents the projection of the center of a vehicle headlamp onto aim screen 152. Origin point 190, located on vertical axis 198, 1½" above intersection 200, is the point at which the reflected laser beam is aimed during the aim test. Aiming the reflected laser beam at origin point 190 simulates the projection of the center of the headlamp onto intersection 200. The 1½" difference between the location of intersection 200 and origin point 190 corresponds to the 1½" vertical offset between the incident and reflected laser beam when prism 110 is used. As explained above, this 1½" offset can be eliminated in embodiments wherein a colinear relationship is established between the laser beam when directed toward the headlamps and the laser beam directed toward the aim screen. In such embodiments, origin point 190 and intersection 200 would coincide.

In a vehicle having dual beam lamps in which one headlamp projects both high and low beams using different filaments, only the low beam aim is checked. In vehicles having separate high beam and low beam headlamps, however, both beams need to be properly aimed.

The SAE standards for aiming high beam headlamps are different than the low beam standard, necessitating a different positioning pattern of high beam aim photosensors 178, 179, 181 and 183. In addition, photosensor array 176 is not used during the high beam aim test, since unlike the low beam illumination pattern, the high beam pattern is not directed downward from and to the right of the vehicle. Because high beams are intended to illuminate equal areas to the right and left of the vehicle, the center of the high beam horizontal illumination pattern should lie at the intersection of horizontal axis 196 and vertical axis 198. Therefore, right horizontal high beam aim photosensor 181 and left horizontal high beam aim photosensor 179 are located 15 inches on either side of the intersection 200 of horizontal axis 196 and vertical axis 198. Upper vertical aim photosensor 178 and lower vertical aim photosensors 183 are located on vertical axis 198 at distances from the horizontal-vertical axes intersection which are not equal. As per SAE specifications, the upper vertical aim photosensor 178 should lie on a vertical axis 2° above an axis drawn perpendicular from the center of the headlamp lens. The lower vertical aim photosensor 183 should lie on vertical axis 2½° below this axis. Each degree at a distance of 25 feet is represented by 5.23 inches on aim screen 152.

The logic board 184 is electrically interconnected to an external power source, the photosensor array 176, aim photosensors 178–183, and aim display meters 202, 204, 206 and 208, the faces of which are shown in FIG. 4. The logic board operates by detecting and comparing electrical signals corresponding to intensity levels sensed by the photosensor array 176 and aim photosensors 178–183, and transmitting electrical signals representing the results of these comparisons to the aim display meters.

Figure 13:
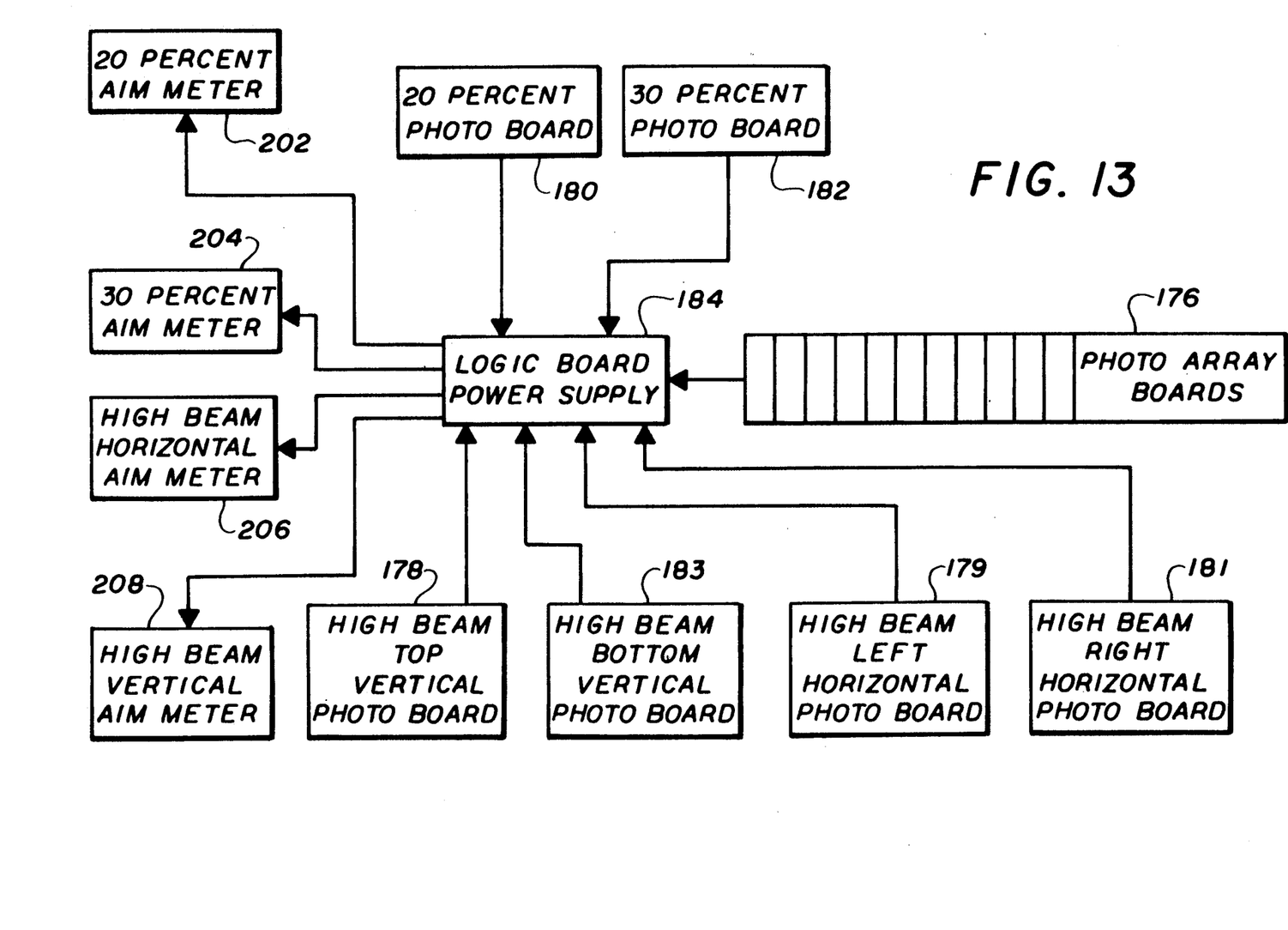
FIG. 13 is a block diagram representing the electronic processing circuitry of the present invention.

FIG. 13 is a block diagram representing the manner in which logic board 184 processes the electrical signals corresponding to the intensity levels sensed by the photosensor array 176 and the aim photosensors 178–183. The logic board operates differently to process electrical signals corresponding to the vehicle low beam, and those corresponding to the vehicle high beam.

When the vehicle low beam shines upon the array of photosensors 176, each photosensor in the array senses the intensity level of the portion of the low beam which shines upon its surface and outputs a voltage signal corresponding to the this intensity level. Because the individual photosensors in the array are connected electrically in parallel, the voltage output of array 176 equals the voltage outputted by the photosensor upon which the brightest portion of the headlamps beam shines. Similarly, aim photosensors 180 and 182 sense the intensity level of the portion of the low beam which shines upon their respective surfaces, and each outputs a voltage signal corresponding to this intensity level.

A first voltage comparator on the logic board 184 compares the voltage outputted by low beam aim photosensor 180, and outputs a first differential voltage.

The meter 202 displays, in percentage form, the quantity:

$$1 - \frac{\text{first differential voltage}}{\text{array output voltage}}$$

For example, if the array output voltage equaled 1.0 volts, and aim photosensor 180 outputted 0.2 volts, the first differential voltage would equal 0.8 volts, and meter 202 would read 20%.

A second voltage comparator on the logic board 184 compares the voltage outputted by the array 176 with the voltage outputted by low beam aim photosensor 182, and outputs a second differential voltage. The meter 204 displays, in percentage form the quantity:

$$1 - \frac{\text{second differential voltage}}{\text{array output voltage}}$$

For example, if the array voltage equaled 1.0 volt, and aim photosensor 182 outputted 0.3 volts, the second differential voltage would equal 0.7 volts, and the meter 204 would read 30%.

When the vehicle high beam shines upon the target screen 152, each of high beam aim photosensors 178, 179, 181 and 183 senses the intensity level of the portion of the high beam which shines upon its surface and outputs a voltage signal corresponding to the intensity level. The outputs of vertical high beam aim photosensors 178 and 183 are electrically connected to the terminals on meter 208 so that the meter reads the difference in voltage outputted by aim photosensors 178 and 183. The outputs of horizontal high beam aim photosensors 179 and 181 are connected electrically to terminals on meter 206 so that the meter reads the difference in voltage outputted by aim photosensors 179 and 181.

Figure 14:
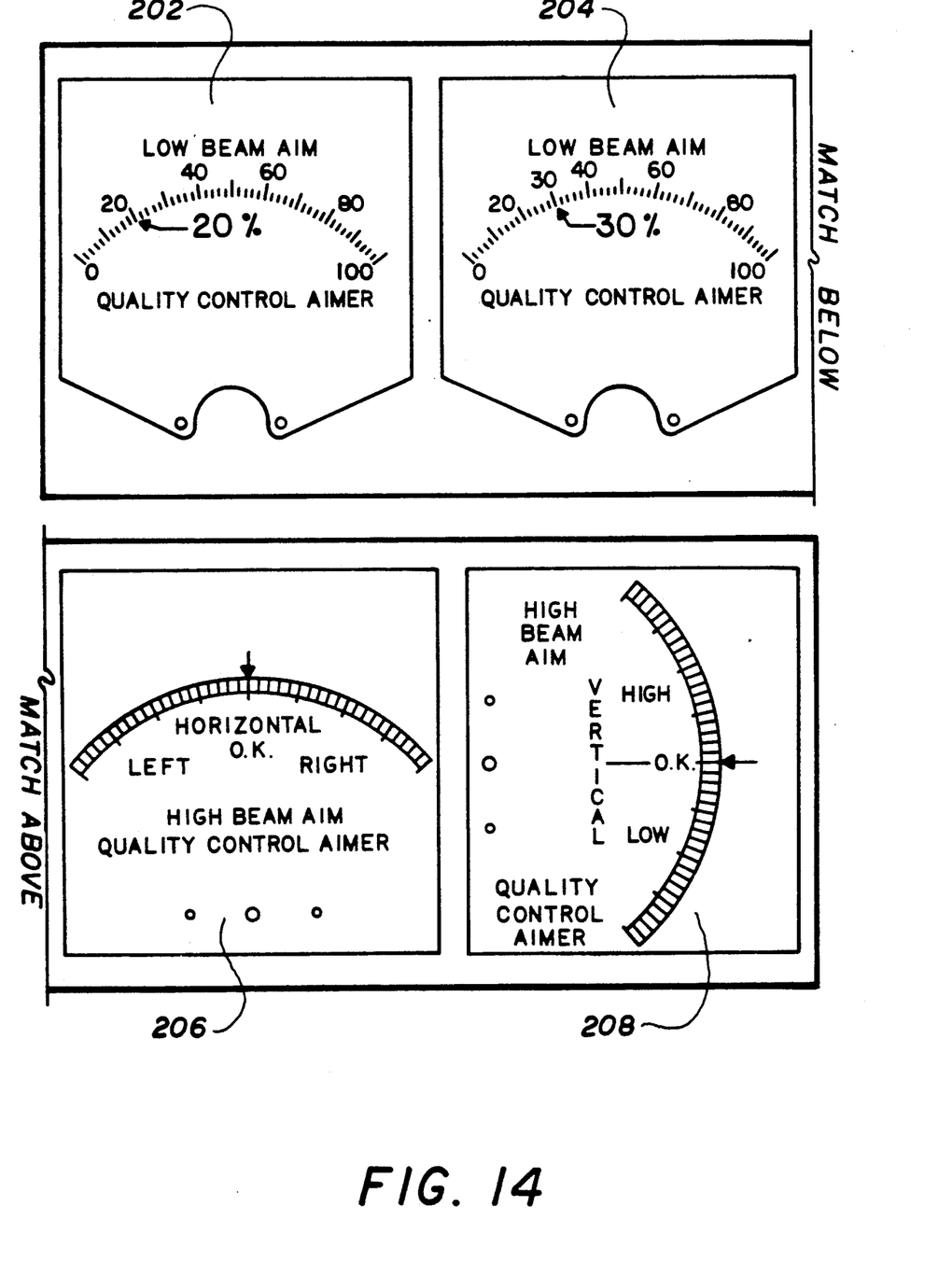
FIG. 14 shows the faces of the aim display meters as mounted in the target screen assembly.

Meters 206 and 208 operate so that if there is no voltage potential difference applied across their respective terminals, needles on the meter faces are centered. A positive potential difference applied across the meter terminals causes the needle to swing to the right. A negative potential difference applied across the meter terminals causes the needle to swing to the left.

The circuit board overlay 174 shown in FIG. 15 has a gradation pattern 175 on which origin point 190 is marked. The gradation pattern is centered around origin point 190, and is preferably marked in quarter-inch increments. In the preferred embodiment, overlay 174 is constructed of a paper-like material. Apertures cut therein correspond to locations of photosensor array 176 and aim photosensors 178–183 and are adapted to permit light to pass therethrough. In an alternative embodiment, the overlay 174 can be constructed of an optically transparent material.

In operation, the vehicle position locator 12 and the target screen assembly 14 are positioned so that a 25 foot space exists between the vehicle headlamps and the target aim screen, per SAE specifications. The operator of the device removes target 55 from its horizontal storage position on the vehicle position locator 12 and places it in holder 57. The prism subassembly is positioned in the path of the laser beam, and the laser tower assembly 56 is moved laterally along rails 66 until stop 59 is encountered. The laser/prism subassembly is moved vertically along rails 72 until the laser beam is centered within target 55. This procedure verifies the parallel alignment of the laser beam with longitudinal axis of the vehicle position locator 12. The target 55 is then returned to its storage position and the vehicle position locator is centered under the vehicle as earlier described.

The laser tower assembly and the laser/prism assembly are again moved along rails 66 and 72, respectively, until the laser beam reflected back by the prism 110 is centered on the lens of the headlamp of the vehicle. This position of the beam is then fixed by locking the position of the tower assembly using brake 68 and locking the position of the laser/prism assembly using pulley brake 80. The prism subassembly 84 is then swung out of the path of the laser output using handle 130, permitting the unobstructed laser light beam to travel to the target screen 25 feet away.

The target screen assembly 14 is moved lateral, on casters 146 to be positioned in front of the vehicle. In the preferred embodiment, marks are placed on the floor under the target screen assembly to insure that aim screen 152 is 25 feet away from the headlamp of a vehicle centered on the vehicle position locator, and to insure that main beam 140 is parallel with lateral beam 18 when the system is in use. Screen 152 is moved vertically along rails 160 until the laser beam falls upon origin point 190. The horizontal position of the target screen assembly 14 is fixed by floor brake 150, and the vertical position of screen 152 is fixed along rails 160 by pulley brake 170. Because the unobstructed laser light beam and the reflected laser light beam centered upon the headlamp lens are 1½" vertically offset, centering the unobstructed beam onto target 190 simulates projection of the center of the headlamp onto the horizontal-vertical axes intersection 200.

With the screen 152 in fixed position, the laser tower assembly 56 on the vehicle position locator is moved horizontally along rails 66 in front of the headlamp of the vehicle which is not presently being tested. The low beams of the vehicle are then turned on. The plywood board 102 attached to the laser/prism subassembly mounting plate 60 is used to block the light emitted by the headlamp not being tested to preclude its beam from reaching the photosensors on the target screen to eliminate extraneous ambient light.

The operator then checks the low beam aim display meters of the target screen assembly. If correct readings of 20% and 30% are obtained on meters 202 and 204, respectively, the low beam headlamp is properly aimed. These readings indicate that 20% and 30% of the maximum intensity sensed by any of photosensors 188 is sensed at low beam aim photosensors 180 and 182, respectively. The operator then proceeds to check the high beam aim, if the vehicle is provided with separate high and low beam lamps. The same procedure as described above is followed, except that the needles on the high beam horizontal and vertical meters 206 and 208 are checked for center position.

Inexact readings obtained during either test indicate headlamps which are not aimed true, but they may nonetheless be aimed within specification tolerances. The extent to which the headlamp is incorrectly aimed is determined by the following procedure.

The floor brake 150 on the target screen assembly 14 and the pulley brake 170 are released, and the screen is repositioned vertically and horizontally as before until proper readings are displayed on the meters. Floor brake 150 and pulley brake 170 are then re-engaged to fix the position of the screen. The headlamps of the vehicle are turned off and the laser tower assembly is repositioned in front of the headlamp being tested. The prism subassembly is positioned again in the path of the laser light beam using handle 130, and the reflected light beam is centered upon the headlamp lens. Readjustment of the vertical position of the laser/prism subassembly should not be necessary. The horizontal position of the laser tower assembly 56 is again fixed using brake 68.

By again swinging the prism subassembly out of the way of the laser beam, the laser beam travels unobstructed toward the screen 152. The distance between the point at which the beam falls and origin point 190 indicates the extent of headlight misalignment. This distance is measured using the pattern of ¼" gradations 175 on the circuit board overlay 174 which is centered around origin point 190. The headlamp is accepted as being aligned within specifications only if the distance measured is less than a prescribed distance. If a repeated pattern of misalignment is observed on plural tests, this data may be used to assist in correcting the device originally being used to aim the headlamp.

What is claimed is:

1. A system for checking the aim of a vehicle headlamp, comprising:
   a vehicle position locator adapted to be aligned with a longitudinal axis of a vehicle;
   a laser movably mounted to said vehicle position locator for lateral movement in front of the vehicle and for vertical movement relative to the vehicle;
   a target assembly positioned a selected distance from a headlamp on said vehicle and having a vertically and laterally adjustable screen, said screen having a plurality of photosensors each sensing a level of intensity of a portion of a light beam from said headlamp shined thereupon;
   means for directing a light beam from said laser in one direction to center on the headlamp when the laser is laterally and vertically positioned in front of and centered on the headlamp, and thereafter for directing said laser beam in another direction to shine on said target screen when said screen is laterally and vertically positioned so that said laser light beam coincides with a marked origin on said screen;
   means for generating electrical signals corresponding to said intensity levels of said headlamp beam as sensed by said plurality of photosensors on said screen when said laser is positioned outside the path of said headlamp beam; and
   means for comparing at least two of said electrical signals and for indicating results of said comparison to determine if the headlamp is properly aimed.

2. The system of claim 1, wherein said selected distance between said target assembly and said headlamp is 25 feet.

3. The system of claim 1, wherein said means for directing said laser light beam comprises a movable prism.

4. The system of claim 3, wherein the position of said prism relative to said laser is adjustable.

5. The system of claim 1, wherein said vehicle position locator includes means for aligning said vehicle position locator with said longitudinal axis of said vehicle.

6. The system of claim 1, further comprising means to verify the parallel alignment of said laser light beam with the longitudinal axis of a vehicle positioned on said vehicle position locator.

7. The system of claim 6, wherein said means for verifying the parallel alignment of said laser light beam with the longitudinal axis of a vehicle positioned on said vehicle position locator includes a target selectively mounted on the vehicle position locator in spaced relationship from the laser when said laser is positioned at a preselected stop location on the locator.

8. The system of claim 4, wherein said prism is rotatably attached to said laser.

9. The system of claim 4, wherein said prism is hingedly attached to said laser.

10. The system of claim 4, wherein said prism is slidably attached to said laser.

11. The system of claim 5, further comprising means for positioning the vehicle position locator and the target assembly with respect to one another so that said screen on said target assembly is perpendicular to said longitudinal axis of a vehicle aligned with said vehicle position locator.

12. The system of claim 1, wherein said means for comparing said electrical signals corresponding to said intensity levels comprises means for comparing the highest level of intensity sensed by any of said photosensors with a predetermined percentage of said highest level of intensity.

13. The system of claim 12, wherein said predetermined percentage of said highest level of intensity is twenty percent (20%).

14. The system of claim 12, wherein said predetermined percentage of said highest level of intensity is thirty percent (30%).

15. The system of claim 1, wherein said means for indicating the results of said comparison of said electrical signals comprises at least one meter to provide a visual readout.

16. The system of claim 1, wherein said plurality of photosensors includes an array of photosensors in which outputs of said array photosensors are connected electrically in parallel.

17. A method of checking the aim of a vehicle headlamp, comprising the steps of:
   directing a light beam emitted by a laser toward a headlamp on said vehicle;
   adjusting the laser so that its beam intersects the center of the headlamp;
   redirecting said laser beam toward a target screen located a selected distance from said headlamp;
   adjusting the target screen so that the laser beam intersects a fixed origin point on the target screen;
   moving said laser out of the optical path of the headlamp light beam;
   shining said headlamp light beam onto a plurality of photosensors on said target screen as adjusted;
   sensing the intensity level of each portion of the projected headlamp light beam shining on each photosensor and generating for each photosensor an electrical signal corresponding to said intensity level;
   comparing at least some of said electrical signals to each other or to an established standard to determine whether the headlamp light beam is aimed within a prescribed degree of accuracy.

18. The method of claim 17, further comprising the steps of:
   moving said target screen laterally and vertically when the headlamp is determined to be improperly aimed until said comparison would otherwise indicate that said headlamp light beam is properly aimed;
   moving said laser until said laser light beam is again directed at the center of said headlamp;
   redirecting said laser light beam at said target screen to provide a reference for the actual location of the center of the headlamp light beam as presently aimed;
   determining the error distance between said reference location of the center of the headlamp light beam as presently aimed and said fixed origin on said target screen as adjusted; and
   determining whether said error distance is within prescribed specifications.

19. The method of claim 17, wherein said selected distance between said target screen and said headlamp is 25 feet.

20. The method of claim 17, wherein each of said plurality of photosensors is a photodiode.

21. The method of claim 17, further comprising the initial step of aligning said laser beam parallel with a longitudinal axis of a vehicle.

22. The method of claim 17, wherein said established standard compared in said step of comparing at least some of said electrical signals is twenty percent (20%) of the maximum level of intensity sensed by any of said photosensors.

23. The method of claim 17, wherein said established standard compared in said step of comparing at least some of said electrical signals is thirty percent (30%) of the maximum level of intensity sensed by any of said photosensors.

24. The method of claim 17, further comprising the step of blocking the light beam emitted by a second headlamp of said vehicle while said aim of said first headlamp is being checked.

25. The method of claim 17, further comprising the step of fixing the position of said laser with respect to said headlamp after said laser light beam is directed at the center of said headlamp.

* * * * *